US008282203B2

(12) United States Patent
Brenner et al.

(10) Patent No.: US 8,282,203 B2
(45) Date of Patent: Oct. 9, 2012

(54) PRINTING MECHANISM AND METHOD OF INK FORMULATION

(75) Inventors: James M Brenner, Vancouver, WA (US); Harold F Mantooth, Vancouver, WA (US); Jeffrey D Langford, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/071,876

(22) Filed: Mar. 25, 2011

(65) Prior Publication Data

US 2011/0168052 A1 Jul. 14, 2011

Related U.S. Application Data

(63) Continuation of application No. 10/903,622, filed on Jul. 30, 2004, now Pat. No. 7,922,314.

(51) Int. Cl.
*C09D 11/00* (2006.01)

(52) U.S. Cl. .................................... 347/100; 106/31.13

(58) Field of Classification Search .................. 347/100; 106/31.13
See application file for complete search history.

(56) References Cited

U.S. PATENT DOCUMENTS 6,003,965 A * 12/1999 Arway et al. ..................... 347/7
6,050,680 A * 4/2000 Moriyama et al. .............. 347/85
2003/0035034 A1* 2/2003 Fukumoto et al. .............. 347/86

* cited by examiner

*Primary Examiner* — Laura Martin

(57) ABSTRACT

One method of ink formulation may include providing a shipping material in a reservoir of a printing mechanism, placing a concentrated ink in communication with the reservoir, and mixing the shipping material and the concentrated ink together to create a print-ready ink.

17 Claims, 3 Drawing Sheets

Fig. 3

PRINT-READY INK 5-8 wt% OF 2-PYRROLIDINONE
6-9 wt% OF EHTYLHYDROXYPROPANEDIOL
6-9 wt% OF 1,5 PENTANEDIOL
3-6t% OF A BLEED CONTROL AGENT
1-4% OF SURFACTANTS
0-2% OF ADDITIVES *(BUFFERS, BIOCIDES, ETC.)*
1-6 wt% OF ONE OR A BLEND OF COLORANTS

SHIPPING FLUID 5-8 wt% OF 2-PYRROLIDINONE
6-9 wt% OF EHTYLHYDROXYPROPANEDIOL
6-9 wt% OF 1,5 PENTANEDIOL
3-6t% OF A BLEED CONTROL AGENT
1-4% OF SURFACTANTS
0-2% OF ADDITIVES *(BUFFERS, BIOCIDES, ETC.)*
0.5-3 wt% OF ONE OR A BLEND OF COLORANTS

CONCENTRATED INK 5-8 wt% OF 2-PYRROLIDINONE
6-9 wt% OF EHTYLHYDROXYPROPANEDIOL
6-9 wt% OF 1,5 PENTANEDIOL
3-6t% OF A BLEED CONTROL AGENT
1-4% OF SURFACTANTS
0-2% OF ADDITIVES *(BUFFERS, BIOCIDES, ETC.)*
2-12 wt% OF ONE OR A BLEND OF COLORANTS

PRINTING MECHANISM AND METHOD OF INK FORMULATION

This application is a continuation of U.S. application Ser. No. 10/903,622, filed Jul. 30, 2004, now U.S. Pat. No. 7,922,314, hereby incorporated by reference.

BACKGROUND

Printing mechanisms, such as printers, typically use one or more print cartridges, sometimes referred to as "pens," which fire drops of liquid colorant, referred to generally herein as "ink," onto a page or like print medium during printing. A print cartridge usually includes a printhead formed with very small nozzles through which the ink drops are fired. To print an image, the print cartridge carrying the printhead can be propelled back and forth across the page, firing drops of ink in a desired pattern as it moves.

Following manufacture, the printing mechanism is shipped or otherwise transported to its final destination for use. Prior to or after shipping the printing mechanism may be stored for extended periods of time. However, storing a printing mechanism with printing fluid, such as ink, therein sometimes leads to nozzle and/or printing fluid reliability problems. In particular, during shipping or storage of the printing mechanism the printing fluid may react with the printing fluid container, suffer from evaporation wherein during use the printing fluid would be more concentrated than desired, and/or dry out or otherwise occlude the printhead nozzle orifices.

BRIEF DESCRIPTION OF THE DRAWINGS

FIG. 3 is a table showing certain exemplary embodiments of a shipping material and a colorant suitable for use in ink formulation.

DETAILED DESCRIPTION OF THE DRAWINGS

Figures 1A, 1B, 1C:
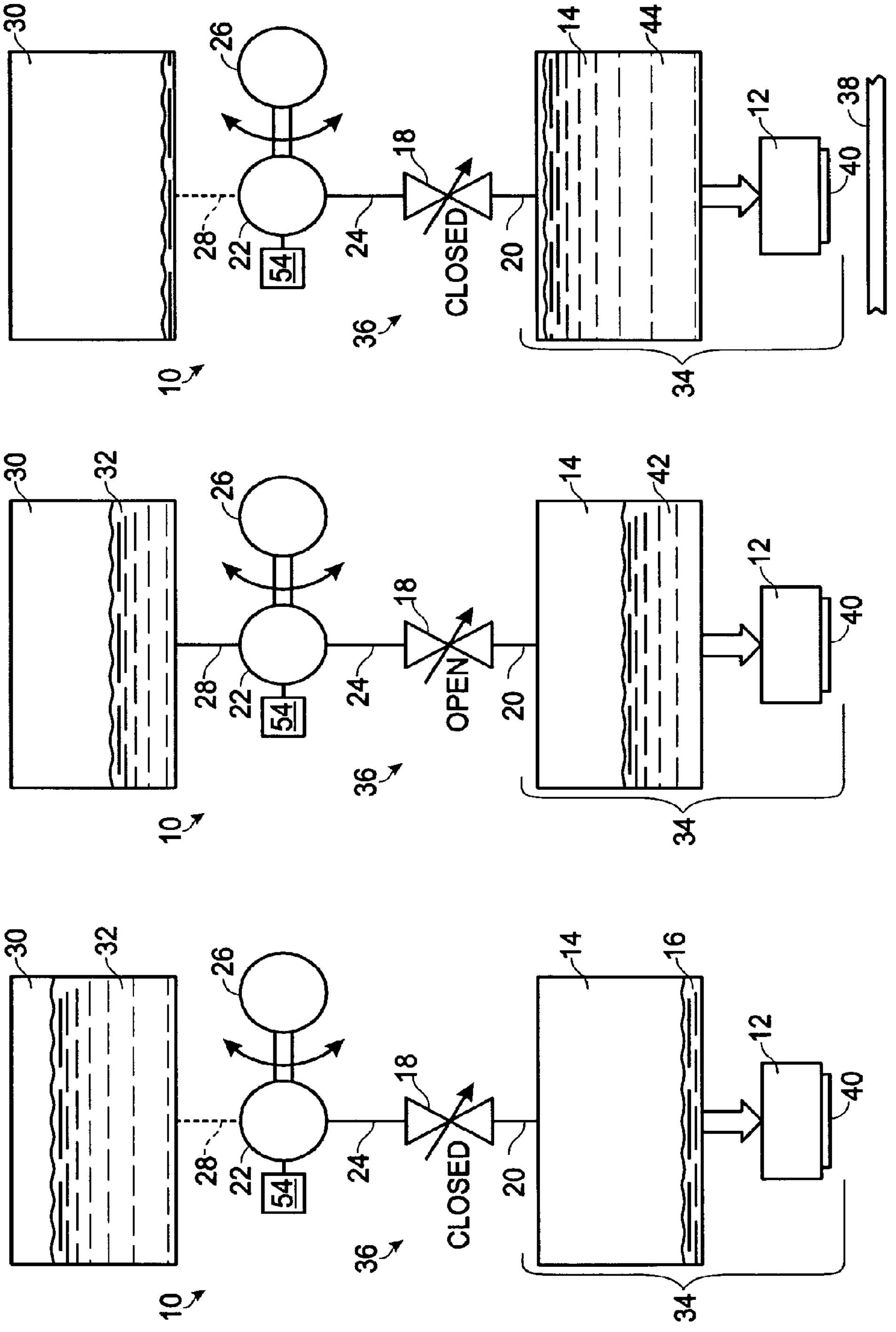
FIGS. 1A-1C are schematic views of an exemplary printing mechanism undergoing an exemplary method of ink formulation.

FIGS. 1A-1C are schematic views of one example embodiment of an ink formulation procedure of one example embodiment of a printing mechanism. The printing mechanism may, for example, be used for the printing of business reports, correspondence, images, desktop publishing, and the like, in an industrial, office, home or other environment. A variety of printing mechanisms, such as, for example, inkjet printing mechanisms are commercially available. Exemplary printing mechanisms may include plotters, portable printing units, copiers, cameras, video printers, facsimile machines, and the like. For convenience, this description illustrates and exemplary environment of an inkjet printer 10. The techniques provided herein, however, are not limited only to inkjet printers . . . .

Referring to FIG. 1A, the shipping or storage state of printer 10 is described. Shipping may be defined as any transport of all or part of printer 10 from one or more locations to another, for example, transporting printer 10 from the manufacturer to a retailer or from a retailer to an end user. While the printer's components may vary, exemplary printer 10 includes a printhead 12 for printing on a print media 38 (see FIG. 1C), a printhead reservoir 14 connected to printhead 12 and adapted for containing a fluid therein and currently holding a shipping material 16, a valve 18 connected to reservoir 14 by a fluid line 20, a pump 22 connected to valve 18 by a fluid line 24, a motor 26 operatively connected to pump 22, and a fluid line 28 adapted for connection to a fluid container, such as a replaceable fluid container 30, which may contain a fluid 32 therein.

Also illustrated in FIG. 1A is logic 54, which is operatively configured to selectively control one or more of the elements of printer 10 as described herein to properly formulate or otherwise establish print-ready ink or other like marking materials.

During shipping or storage of printer 10, container 30 can be detached from fluid line 28 wherein container 30 and fluid line 28 are each sealed to the surrounding environment and each other. Container 30 may be shipped and/or stored together with or separately from the remainder of printer 10. For example, if shipped or stored together, container 30 may be contained within the same shipping container, such as a cardboard shipping container. If shipped or stored separately, container 30 may be purchased separately by a consumer prior to ink formulation by printer 10. During ink formulation by printer 10, container 30 generally will be connected to fluid line 28 such that container 30 and pump 22 are fluidly connected together.

Printhead 12 and reservoir 14 are often referred to as the printhead assembly 34 of printer 10, and valve 18, pump 22, motor 26 and container 30 as the ink delivery system 36 of printer 10. In certain exemplary embodiments printhead assembly 34 may comprise a permanent printhead 12 and a permanent printhead reservoir 14. A permanent reservoir and printhead are typically not removed from the printer during the life of the printer. Accordingly, printhead 12 and reservoir 14 may be refilled numerous times during the life of the printer without replacement of printhead 12 or reservoir 14. In such embodiments, during times other than ink formulation by printer 10, fluid container 30 may be detached from fluid line 28. In such examples, fluid container 30 may include a disposable fluid container wherein multiple containers 30 may be subsequently purchased and connected to fluid line 28 during the life of printer 10 for the refilling of ink into reservoir 14. In this manner, permanent reservoir 14 and printhead 12 may be replenished with printing fluid during the life of the printer without removal of these components from printer 10.

Still referring to FIG. 1A, during shipping or storage of printer 10, material 16 contained with printhead reservoir 14 includes a shipping material 16 having properties that may enhance the print quality and reliability of printer 10 after initialization and during use. In particular, shipping material 16 may resist evaporation of fluid during shipping of printer 10, reduce occlusion of nozzle orifices (not shown) of a printhead nozzle orifice plate 40 of printhead 12 during shipping, facilitate a quick and efficient start-up of the printer 10, reduce the waste fluid storage requirements of printer 10, and/or eliminate disposal hazards associated with prior art storage fluids. In certain exemplary embodiments, for example, shipping material 16 includes a colorless material that is less susceptible to evaporation than a print-ready ink such that, during shipping or storage of the printing mechanism, components of the shipping material are not easily evaporated, and which thereby facilitate a nominal print-ready ink chemistry upon mixing of the shipping material with a colorant, concentrated ink or the like to create a nominal print-ready ink. Shipping material 16, which may comprise a liquid, gas or solid diluent, may be defined as a material having less colorant than print-ready ink 44. Print-ready ink 44 may be defined as containing colorant in an amount suitable for printing by printer 10 on a suitable print media.

Referring to FIG. 1B, the material contained within container 30 may comprise a concentrated ink 32 which may be in solid form, such as a dry powder, or in liquid form. Concentrated ink 32 may be defined as having more colorant than print-ready ink 44. During the ink formulation process, container 30, if not already connected, is connected to fluid line 28 and pump 22. Pump 22 is then operated to mix concentrated ink 32 with shipping material 16 to form ink 42. Accordingly, pump 22, in conjunction with valve 18, first pumps concentrated ink 32 into reservoir 14 to create ink 42. The ink 42 may then be pumped in the reverse direction back to container 30, and then re-pumped back into reservoir 14. This back and forth mixing process may be conducted several times, wherein all or part of ink 42 is pumped between container 30 and reservoir 14 to ensure adequate mixing. In other exemplary embodiments, shipping material 16 is first pumped into container 30 to create an ink in container 30, where after all or part of the ink is moved by pump 22 back and forth between reservoir 14 and container 30, for example, pumping all or part of concentrated ink 32 and shipping material 16 at least two times between reservoir 14 and container 30. In other embodiments, concentrated ink 32 may be pumped into reservoir 14 where after no further mixing or pumping is required to produce ink 42 in reservoir 14.

Referring to FIG. 1C, after sufficient mixing of ink 42, which may encompass only one or any suitable number of passes of concentrated ink 32 and/or shipping material 16 through pump 22, ink 42 may be pumped into reservoir 14, valve 18 can be closed, fluid line 28 removed or sealed, and empty container 30 disconnected and/or removed from fluid line 28. At this point in the process, reservoir 14 includes a fully mixed ink, also referred to as print-ready ink 44, which ready for printing on a print media 38 by printhead 12. As stated earlier, print-ready ink 44 contains colorant in an amount suitable for printing by printer 10. The print medium 38 may be any type of suitable material, such as paper, cardstock, transparencies, Mylar, and the like, but for convenience, the printing process may be described using a sheet of paper as the print medium. Further, print-ready ink 44 may include a nominal ink chemistry heretofore found to possess desirable printing characteristics such as high quality images, fast drying times, and ink longevity once printed on the print media.

Thus, as described above, FIG. 1A essentially represents a shipping condition, FIG. 1B a pumping or a mixing condition, and FIG. 1C a printing condition of printer 10.

Figure 2:
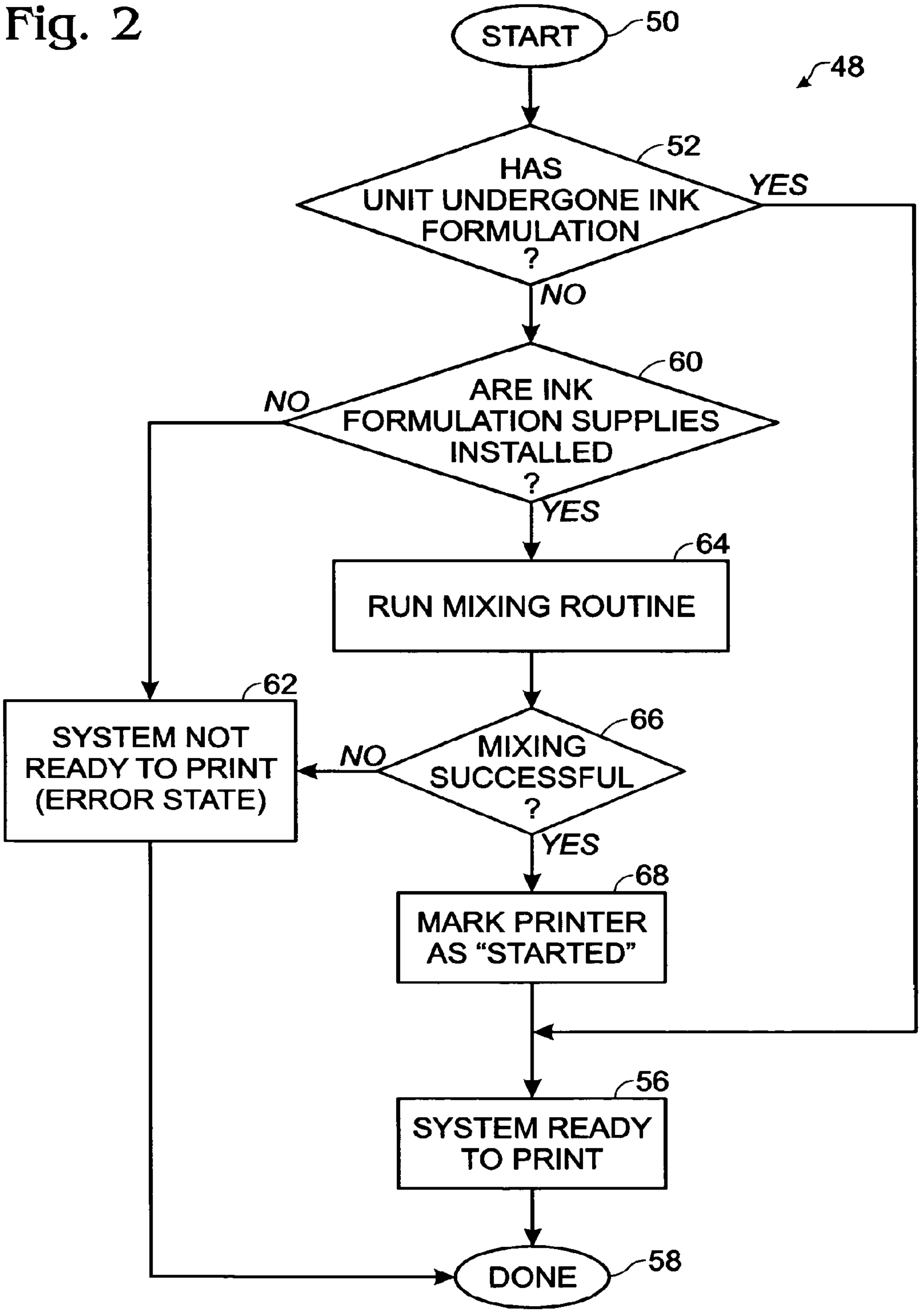
FIG. 2 is a flowchart of an exemplary method of ink formulation.

FIG. 2 is a flowchart of one example embodiment of an ink formulation method 48. Referring to FIGS. 1A-1C and FIG. 2, in step 50, an operator may begin the ink formulation process of printer 10 such as by touching a start-up button on an operator display (not shown) of printer 10, or by any such method that may be appropriate. In certain other exemplary embodiments, ink formulation method 48 begins automatically, for example, upon power first being applied to printer 10. In step 52 logic 54 (shown schematically in FIGS. 1A-1C) of printer 10 may determine whether printer 10 has undergone the ink formulation procedure before, for example, by accessing data stored in memory within logic 54. If the answer in step 52 is "yes," method 48 continues with step 56 indicative that the printer is ready to print, and the ink formulation process is complete.

If the answer in step 52 is "no," then in step 60 it is determined whether ink formulation supplies have been properly installed. Such ink formulation supplies may include, for example, container 30 and fluid 32 contained therein. If the answer in step 60 is "no," then method 48 continues with step 62 which identifies, for example, to the operator through a display screen (not shown) that printer 10 is not ready to print. Here, for example, logic 54 may also provide a message that the ink formulation supplies are not present or may not be properly installed or connected. If the answer in step 60 is "yes," then methods 48 continues with a mixing routine in accordance with step 64, for example, as described above with respect to FIG. 1B.

Next, in step 66, it is determined whether mixing routine 64 was successful. In certain exemplary embodiments, the ink contained within container 14 after mixing may be tested by any suitable sensor (not shown) or other like means to determine if the ink contains colorants in an amount suitable for printing. If the answer to step 66 is "yes," then the ink mixing routine is considered successful in step 56 as described above. Conversely, if the answer to step 66 is "no," then method 48 continues with step 62 as described above. Following steps 62 or 56, method 48 is completed in step 58.

Exemplary method 48 may be implemented, for example, in logic 54. Those skilled in the art will recognize that logic 54, while illustrated as being operatively connected to pump 22 in FIGS. 1A-C, may be configured in other ways and/or combined with other logic circuitry associated with printer 10. For example, logic 54 may be operatively connected to motor 26, valve 18, printhead 12, or the like. Furthermore, the term "logic" as used herein is representative of hardware, firmware, software, or any combination thereof, and including any other circuitry and/or mechanisms used to operatively perform the functionality described herein.

FIG. 3 is a table showing certain exemplary implementations of a shipping material and a concentrated ink that may be utilized for method 48. It should be understood that in different embodiments the compositions of the materials may vary and are not limited to the parameters described herein or shown in FIG. 3.

Here, exemplary shipping material 16 includes a fluid having properties similar to a ready-to-use ink formulation, but including less colorant, also referred to as solids, than the ready-to-use ink formulation. For example, an exemplary shipping material 16 formulation includes the components listed in FIG. 3 such as: about 5 to about 8 weight percent 2-pyrrolidinone; about 6 to about 9 weight percent ethylhydroxypropanediol; about 6 to about 9 weight percent of 1,5-pentanediol; about 3 to about 6 weight percent of a bleed control agent; about 1 to about 4 weight percent surfactant; about zero to about 2 weight percent of additives such as buffers, biocides and the like; and about 0.5 to about 3 weight percent of one or a blend of colorants. Related concentrated ink 32 includes: about 5 to about 8 weight percent 2-pyrrolidinone; about 6 to about 9 weight percent ethylhydroxypropanediol; about 6 to about 9 weight percent of 1,5-pentanediol; about 3 to about 6 weight percent of a bleed control agent; about 1 to about 4 weight percent surfactant; about zero to about 2 weight percent of additives such as buffers, biocides and the like; and about 2 to about 12 weight percent of one or a blend of colorants. In such an embodiment, the final print-ready ink 44, after mixing of shipping material 16 and concentrated ink 32 includes: about 5 to about 8 weight percent 2-pyrrolidinone; about 6 to about 9 weight percent ethylhydroxypropanediol; about 6 to about 9 weight percent of 1,5-pentanediol; about 3 to about 6 weight percent of a bleed control agent; about 1 to about 4 weight percent surfactant; about zero to about 2 weight percent of additives such as buffers, biocides and the like; and about 1 to about 6 weight percent of one or a blend of colorants.

In the above listed formulations the remaining weight percentage of each formulation may comprise an inert ingredient such as water. Accordingly, in one example embodiment shipping material 16 may be referred to as containing less colorant or colorants than print-ready ink 44 and concentrated ink 32 may be referred to as containing more colorant or colorants than print-ready ink 44. In other words, shipping material 16 may contain colorant or a blend of colorants having a weight percent in a range of zero to less than 100 percent of the colorant or blend of colorants found in print-ready ink 44, and concentrated ink 32 may contain colorant or a blend of colorants having a weight percent in a range of greater than 100 percent of the colorant or blend of colorants found in print-ready ink 44. Stated still another way, shipping material 16 may contain less colorant, also referred to as solids, than print-ready ink 44 and concentrated ink 32 may contain more colorant, also referred to as solids, than print-ready ink 44. After suitable formulation, print-ready ink 44 may be ejected from printhead 40 onto a print media 38 (see FIG. 1C) to form an image thereon.

In still another exemplary formulation, shipping material 16 may include: about 5 to about 8 weight percent 2-pyrrolidinone; about 6 to about 9 weight percent ethylhydroxypropanediol; about 6 to about 9 weight percent of 1,5-pentanediol; about 3 to about 6 weight percent of a bleed control agent; about 1 to about 4 weight percent surfactant; about zero to about 2 weight percent of additives such as buffers, biocides and the like; and water and other inert ingredients as the remaining weight percentage of the shipping material 16. Concentrated ink 32 may comprise 100 percent, i.e. substantially pure, of one or a blend of colorants, wherein concentrated ink 32 is added to shipping material 16 in an amount such that print-ready ink 44 may include 1 to 6 weight percent of one or a blend of the colorants.

Again, the specific formulations described above and shown in FIG. 3 are exemplary formulations provided by way of example only and are not intended to be limiting. Other suitable formulations may be alternatively employed in accordance with the general teachings set forth above. For example, the amount of colorant in a print-ready ink may depend on the type of print media being printed upon, wherein the amount of colorant in such a particular print-ready ink will determine the corresponding suitable ranges of amounts of colorant in the shipping material and in the concentrated ink.

Other enhancements may be made to the servicing mechanism wherein such variations and modifications of the concepts described herein fall within the scope of the claims below.

We claim:

1. A method for formulating ink comprising:

providing a shipping material having a first amount of colorant;

providing a concentrated ink having a second amount of colorant;

mixing the shipping material and the concentrated ink to form a print-ready ink, wherein the first amount of colorant by weight is 0.5 to 3% and less than the second amount of colorant by weight and the print-ready ink has more colorant than the shipping material but less colorant than the concentrated ink by weight.

2. The method according to claim 1 wherein, the mixing step takes place by combining the shipping material and the concentrated ink by transferring the shipping material and the concentrated ink between two reservoirs.

3. The method according to claim 2 wherein, the transferring step is performed at least twice.

4. The method according to claim 1 wherein, the shipping material is placed in a reservoir of a printhead assembly.

5. The method according to claim 4 wherein, the reservoir of a printhead assembly is placed in contact with a cartridge having the concentrated ink.

6. The method according to claim 1 wherein, the concentrated ink is placed in a cartridge.

7. The method according to claim 1 wherein, the concentrated ink comprises colorant in 2 to 12% by weight.

8. The method according to claim 1 wherein, the print-ready ink comprises colorant in 1 to 6% by weight.

9. The method according to claim 1 wherein, the concentrated ink is a solid or a liquid.

10. An ink composition comprising:

a shipping material having a first amount of colorant; and a concentrated ink having a second amount of colorant;

wherein the shipping material and the concentrated ink are mixed to form a print-ready ink, and wherein the first amount of colorant by weight is 0.5 to 3% and less than the second amount of colorant by weight and the print-ready ink has more colorant than the shipping material but less colorant than the concentrated ink by weight.

11. The ink composition according to claim 10 wherein, the concentrated ink comprises colorant in 2 to 12% by weight.

12. The ink composition according to claim 10 wherein, the print-ready ink comprises colorant in 1 to 6% by weight.

13. The ink composition according to claim 10 wherein, the shipping material further comprises at least one of 2-pyrrolidinone, ethylhydroxypropanediol, 1,5-pentanediol, a bleeding control agent, and surfactant.

14. The ink composition according to claim 13 wherein, the 2-pyrrolidinone is present in an amount of 5 to 8% by weight; the ethylhydroxypropanediol is present in an amount of 6 to 9% by weight; the 1,5-pentanediol is present in an amount of 6 to 9% by weight; the bleeding control agent is present in an amount of 3 to 6% by weight; or the surfactant is present in an amount of 1 to 4% by weight.

15. The ink composition according to claim 10 wherein, the concentrated ink further comprises at least one of 2-pyrrolidinone, ethylhydroxypropanediol, 1,5-pentanediol, a bleeding control agent, and surfactant.

16. The ink composition according to claim 15 wherein, the 2-pyrrolidinone is present in an amount of 5 to 8% by weight; the ethylhydroxypropanediol is present in an amount of 6 to 9% by weight; the 1,5-pentanediol is present in an amount of 6 to 9% by weight; the bleeding control agent is present in an amount of 3 to 6% by weight; or the surfactant is present in an amount of 1 to 4% by weight.

17. The ink composition according to claim 10, wherein the shipping material or the concentrated ink further comprise 1 to 4% by weight of additives.

* * * * *